United States Patent Office 3,133,194
Patented May 12, 1964

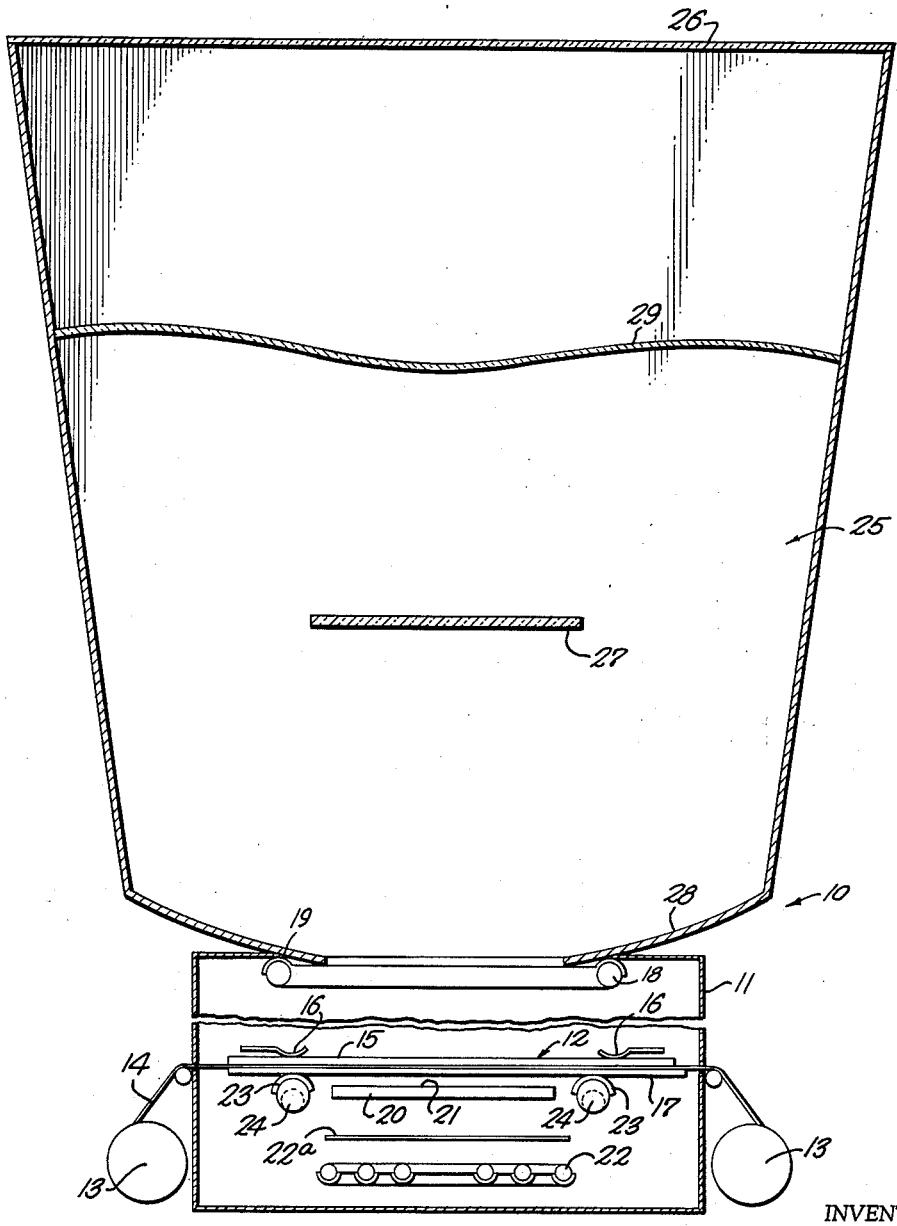

3,133,194
IMAGE ENHANCEMENT AND DISPLAY
APPARATUS
Joseph H. Watson, 429 Beaumont Court, Fairfax, Va., and
Alfred J. Watson, 2109 S. Buchanan St., Arlington, Va.
Filed Oct. 24, 1961, Ser. No. 147,340
7 Claims. (Cl. 250—71)

The present invention relates to methods and apparatus for enhancing the imagery contained in photographic negative or positive transparencies and simultaneously displaying the imagery so enhanced, and more particularly to means for enhancing imagery from aerial or other photographs in a manner enabling immediate viewing of the enhanced image by unsharp mask photographic dodging techniques.

In many photogrammetric and photographic interpretation applications, it is desirable to provide means for increasing tone contrast between an object in the photographic record and its surroundings, and frequently to achieve substantial magnification to pull out fine detail from the transparency records. Heretofore, the practice has been to utilize electronic analysis of photographs by flying-spot scanners, in which image enhancement is obtained in an electronic system and is visible only in photo-reproductions or, less usefully from the standpoint of range and quality of enhancement obtainable, on cathode ray tube display of the scanning spot as enhanced electronically. These existing systems and methods are inherently slow and expensive to implement and operate, and cannot yield image resolutions or precisions, or enhancement qualities exceeding the limitations of the complex electronic circuitry required for flying-spot scanning, signal modulation, and re-creation of images on cathode ray tubes or by such tubes on photographic film.

The present invention has for an object a novel means for utilizing the effect known to those skilled in the art of photoprocessing as the "unsharp mask dodging effect" to obtain enhancement of all the imagery contained in a single photographic transparency by enabling the simultaneous projection of both the original transparency and a mask formed by projection of the original transparency over a short distance to a phosphor to yield a blurred and reversed image thereof. The combination of original transparency and reversed blurred image thereof, viewed simultaneously and in register, results in strong enhancement of the zones of change in density of the original transparency, which zones of change define the boundaries of the image contained in a photograph. By varying the degree of excitation of the phosphor or the intensity of quenching energy used, the degree of enhancement can be made variable at will and during observation to yield the optimum enhancement effect for any given type of image contrasts encountered in the original photography.

Another object of the present invention is a new means for projecting and displaying the imagery so enhanced, with an absolute minimum of deterioration due to optical projection, to enable observation of enlarged and enhanced high-quality images at most convenient scales and projections by utilizing the inherent high-resolution low-aberration characteristics of mirror optics as applied in the device known to optical experts as the "Schmidt Camera" projection system. The original transparency and reversed unsharp image, observed without parallactic image displacement by the Schmidt Camera projection system represents a new and powerful combination of means for ensuring full and complete observation, at optimum enhancement levels, of large quantities of photographic images.

Other objects, advantages, and capabilities of the present invention will become apparent from the following detail description, taken in conjunction with the accompanying drawing.

An exemplary form of apparatus which may be employed in the practice of the present invention is illustrated in the figure of the accompanying drawing.

Referring to the drawing, the exemplary apparatus for enhancing the imagery contained in a photographic transparency and simultaneously displaying the enhanced imagery in magnified form is indicated generally by the reference character 10 and includes a lower housing 11 in which is mounted a photographic holder assembly 12 with associated reel supports 13 for mounting and sequential movement of roll film 14 in the form of photographic positive or negative transparencies. It will be apparent, of course, that single photographic transparencies not arranged in roll form can be inserted individually in the holder assembly 12. The holder assembly 12 includes a transparent pressure plate 15 which is supported within the housing 11 by suitable springs diagrammatically indicated at 16 which resiliently urge the pressure plate 15 downwardly to maintain intimate contact of the entire surface of the film contained within the limits of the four edges of the holder assembly 12 with the surface of a thin transparent staging plate 17 which forms a flat supporting surface for the film. An infrared quenching source 18 is mounted in the housing 11 in this exemplary embodiment so as to irradiate over the whole surface of the film in the holder assembly 12. In this embodiment, the infrared quenching source is in the form of a plurality of elongated infrared lamps arranged in a rectangular pattern about the opening 19 in the top of the lower housing portion 11, although it will be apparent that other types of infrared lamps and other dispositions of the lamps may be resorted to. The infrared quenching source 18 is spaced vertically above the film plane sufficiently so that the infrared rays subtend only a small angle with the vertical or normal axis perpendicular to the film plane. A fluorescent screen or a phosphor plate 20 surfaced with a suitable phosphor, indicated at 21, excitable by ultraviolet and quenchable by infrared, for example a phosphor of the type bearing commercial designation $r1$, is disposed below the thin transparent staging plate 17 in slightly spaced relation, and is excited by the ultraviolet source 22 mounted in the lower region of the housing 11 to emit bright visible light rays. The phosphor plate 20 is preferably fixedly mounted in the housing 20 in the manner which will permit removal of the phosphor plate for replacement. An ultraviolet filer 22a may also be disposed above the ultraviolet source 22 to limit the range of frequencies of the energy for exciting the phosphor 21.

Means are provided to permit manual adjustment of the vertical spacing between the thin transparent stage plate 17 and the stationary phosphor plate 20, which in the exemplary embodiment comprises a pair of transverse downwardly directed arcuate or half tubular followers or saddles 23 at the leading and trailing edges of the stage plate 17 relative to the film advancement path, fixed for example to a frame or strap secured to the plate 17. The followers 23 ride upon eccentric separation cams or shafts 24 journaled in the opposite sides of the housing 11 or suitable bearings fixed to the sides of the housing and rotatable to elevate and lower the transparent stage plate 17 relative to the stationary phosphor plate 20. If desired, the separation cams 24 may be geared together and actuated by a single knob extending externally of the housing 11 to permit their simultaneous adjustment.

Where areas of low image density occur on the film 14 contained in the holder assembly 12, the infrared rays from the infrared source 18 pass through the film and through the transparent stage plate 17 to quench the phosphor 21 and result in strong reduction of the intensity of the visible rays emitted at the phosphor 21 for such low density areas. Where areas of high image density occur in the film 14 contained in the holder assembly 12 few infrared rays pass through the transparent stage plate 17 to quench the phosphor 21 and visible emission from the phosphor 21 in these areas is a maximum. Because of the separation of the emulsion of the film 14 in the holder assembly 12 from the surface of the phosphor 21, and because of the slight divergency from the vertical of the propagation axes of the infrared rays from the infrared source 18, the images contained in the film are blurred on reaching the phosphor 21 and the reversal imagery thus obtained in the phosphor 21 is unsharp at all points. Observation from a point above the surface of the film 14 in the holder assembly 12 will disclose that such image edge therein is thus "backed up" by the reversed counterpart of this edge, blurred out by the distance separating the emulsion from the phosphor, and that pronounced enhancement of image edges even to the point of apparent "bas relief" effect can be observed by varying the relative intensity of quenching and simultaneous radiation affecting the phosphor 21.

Simultaneous observation of the original film in holder assembly 12 and the reversed imagery in phosphor 21 is obtained in accordance with this invention at enlarged scales by the Schmidt camera projection system 25 disposed above and preferably mounted on the housing 11 so as to focus the enlarged view of the film in holder assembly 12 on viewing surface 26. This is accomplished by means of collecting mirror 27, spherical reflector 28, and aspherical correction plate 29.

Any of several expedients may be resorted to after the image of the enhanced imagery is focused in the plane of viewing surface 26, including but not limited to direct viewing, photocopying by substituting a sensitized material for the viewing surface 26, image recognition analysis by substituting a scanner or a battery of photosensitive elements for viewing surface 26, or other applications which will be apparent to those versed in the arts of photointerpretation, photoreproduction, or allied graphic fields.

It will be apparent that by use of the above-described apparatus, direct and intermediate viewing of enhanced and enlarged imagery from aerial or other photographic records may be obtained without intervening photoprocessing or scanning processes and without requiring the use of complex electronic circuitry such as is inherently involved in electronic analysis and enhancement. By varying the angular positions of the eccentric separation cams 24, the stage plate 17 and transparency supported thereby are adjusted vertically to different spaces relative to the phosphor 21 while maintaining the film plane substantially in parallelism with the plane of the phosphor to permit alteration and adjustment of the degree of blurring or unsharpness of the reversed image produced by the phosphor and achieve photo enhancement of the zones of change intensity of the transparency defining the boundaries of the images contained in the photographic record. By virtue of the Schmidt camera system disposed above the photographic record, this enhanced image is optically enlarged so that the viewer or the sensing facility is immediately subjected to an enlarged enhanced image. The device therefore provides a particularly valuable tool for immediate and direct visual inspection of aerial photographs wherein selective image enhancement is available to facilitate study of image detail and particularly to permit selection and reproduction at will of any selected image or set of images from a succession of such photographs.

While but one preferred example of the present invention has been particularly shown and described, it is apparent that various modifications may be made therein within the spirit and scope of the invention, and it is desired, therefore, that only such limitations be placed on the invention as are imposed by the prior art and set forth in the appended claims.

What is claimed is:

1. Apparatus for enhancing imagery of photographic transparency records containing an image comprising record positioning means for supporting an image-containing record in a record plane, a light source supported at a fixed station in a plane paralleling and spaced below the record plane, said light source being of a material responsive to exciting radiation to produce visible light and to quenching radiation to quench the luminescence of the same in accordance with the quanta of the quenching radiation received thereby, an exciting radiation energy source disposed below said light source for activating the latter to luminescence, a quenching radiation source supported above said record plane for directing quenching radiation to said light source through said transparency to be modulated by density variations in the transparency image and differentially quench luminescence of the light source in relation to density variations in the transparency image, and means adjustably supporting said record positioning means for movement through a range of positions perpendicular to the plane of said light source for selectively varying the spacing between the transparency plane and the light source plane to produce an unsharp reversed image of the infrared energy transmitted through said transparency to said light source in relation to the spacing between said transparency plane and said light source plane, and means for viewing said transparency and unsharp reversed image thereof simultaneously and in substantial register to produce an enhanced image of the zones of change in density of the transparency.

2. Apparatus for enhancing imagery of photographic transparency records containing an image comprising transparency holder means for supporting an image-containing transparency in a record plane, a substantially planar light source having an area substantially coextensive with the area of the image supported at a fixed station in a plane paralleling and spaced below the record plane excitable by ultraviolet radiant energy to produce light in the visible range of frequencies, said light source being of a material responsive to infrared radiation to quench the luminescence of the same in accordance with the quanta of the radiant energy received thereby, an ultraviolet radiant energy source disposed below said light source for exciting the latter, an infrared radiation source supported above the record plane for directing infrared radiation energy to said light source through said transparency to be modulated by density variations in the transparency image and differentially quench luminescence of the light source in relation to density variations in the transparency image, movable supports for said transparency holder means adjustable through a range of movement perpendicular to the plane of said light source for selectively varying the spacing between the transparency plane and the light source plane to produce blurring of the infrared energy image transmitted through said transparency to said light source at the zones of density change of the image in relation to the spacing between the record plane and said light source plane and cause the light source to exhibit an unsharp reversed image of the transparency image, and means for viewing said transparency and unsharp reversed image thereof simultaneously and in substantial register to produce a composite image wherein the zones of change in density of the transparency are enhanced.

3. Apparatus for enhancing imagery of photographic transparency records containing an image comprising a transparent stage plate for supporting an image containing transparency in a selected record plane, a transparent pressure plate superposed over said stage plate and biased toward the latter for maintaining the transparency in flat condition on the stage plate, a substantially planar fluorescent screen having an area substantially coextensive with the area of the image in the transparency supported at a fixed station in spaced parallel relation below said stage plate, said fluorescent screen forming a back lighting light source for illuminating the transparency on said stage plate and having a coating of a material excitable by ultraviolet radiant energy to produce light of visible frequency and being responsive to infrared radiation to quench the luminescence of the same in accordance with the quanta of infrared radiation received thereby, an ultraviolet radiant energy source disposed below said fluorescent screen for exciting the latter, an infrared radiation source supported above said selected record plane for directing infrared radiation energy to said fluorescent screen through said transparency record to be modulated by density variations in the transparency image and differentially quench luminescence of the fluorescent screen in relation to density radiations in the transparency image, manually adjustable supports for said stage plate movably supporting the stage plate in parallelism with said fluorescent screen over a range of positions above said fluorescent screen, means for adjusting said adjustable supporting means for varying the spacing between the selected record plane and the fluorescent screen to distort the infrared image transmitted through said transparency record to said fluorescent screen in relation to the spacing between the selected record plane and the transparency screen and produce an unsharp reversed image of the record image on the fluorescent screen in substantial register with the record image, and means for viewing said transparency image and unsharp reversed image thereof simultaneously and in substantial register to produce an enhanced composite image.

4. Apparatus for enhancing imagery of photographic transparency records containing an image comprising a transparent stage plate for supporting an image containing transparency in a selected record plane, a transparent pressure plate superposed over said stage plate and biased toward the latter for maintaining the transparency in flat condition on the stage plate, a substantially planar fluorescent screen having an area substantially coextensive with the area of the image in the transparency supported at a fixed station in spaced parallel relation below said stage plate, said fluorescent screen forming a back lighting light source for illuminating the transparency on said stage plate and having a coating of a material excitable by ultraviolet radiant energy to produce light of visible frequency and being responsive to infrared radiation to quench the luminescence of the same in accordance with the quanta of infrared radiation received thereby, an ultraviolet radiant energy source disposed below said fluorescent screen for exciting the latter, an infrared radiation source supported above said selected record plane for directing infrared radiation energy to said fluorescent screen through said transparency record to be modulated by density variations in the transparency image and differentially quench luminescence of the fluorescent screen in relation to density radiations in the transparency image, manually adjustable supports for said stage plate movably supporting the stage plate in parallelism with said fluorescent screen over a range of positions above said fluorescent screen, means for adjusting said adjustable supporting means for varying the spacing between the selected record plane and the fluorescent screen to distort the infrared image transmitted through said transparency record to said fluorescent screen in relation to the spacing between the selected record plane and the transparency screen and produce an unsharp reversed image of the record image on the fluorescent screen in substantial register with the record image, an image magnification means disposed above said stage plate and pressure plate for magnifying the transparency image and the unsharp reversed image thereof in substantial register to produce an enhanced enlarged image of the zones of change in density of the transparency record.

5. Apparatus for enhancing imagery of photographic transparency records containing an image comprising a transparent stage plate for supporting an image containing transparency in a selected record plane, a transparent pressure plate superposed over said stage plate and biased toward the latter for maintaining the transparency in flat condition on the stage plate, a substantially planar fluorescent screen having an area substantially coextensive with the area of the image in the transparency supported at a fixed station in spaced parallel relation below said stage plate, said fluorescent screen forming a back lighting light source for illuminating the transparency on said stage plate and having a coating of a material excitable by ultraviolet radiant energy to produce a light of visible frequency and being responsive to infrared radiation to quench the luminescence of the same in accordance with the quanta of infrared radiation received thereby, an ultraviolet radiant energy source disposed below said fluorescent screen for exciting the latter, an infrared radiation source supported above said selected record plane for directing infrared radiation energy to said fluorescent screen through said transparency record to be modulated by density variations in the transparency image and differentially quench luminescence of the fluorescent screen in relation to density radiations in the transparency image, supporting means for said stage plate including a pair of eccentric rotatable members upon which the stage plate rests adjacent a pair of opposite edges of the stage plate, means for rotating said eccentric members about their axes for moving the stage plate vertically and thereby adjusting the spacing between the transparency supported on the stage plate and the fluorescent screen to produce blurring of the infrared image transmitted through said transparency to said fluorescent screen at the zones of density change of the image in relation to the spacing and cause the fluorescent screen to exhibit an unsharp reversed image of the transparency image, and means for viewing said transparency and unsharp reversed image simultaneously and in substantial register to produce a composite enhanced image.

6. Apparatus for enhancing imagery of photographic transparency records containing an image comprising a transparent stage plate for supporting an image containing transparency in a selected record plane, a transparent pressure plate superposed over said stage plate and biased toward the latter for maintaining the transparency in flat condition on the stage plate, a substantially planar fluorescent screen having an area substantially coextensive with the area of the image in the transparency supported at a fixed station in spaced parallel relation below said stage plate, said fluorescent screen forming a back lighting light source for illuminating the transparency on said stage plate and having a coating of a material excitable by ultraviolet radiant energy to produce a light of visible frequency and being responsive to infrared radiation to quench the luminescence of the same in accordance with the quanta of infrared radiation received thereby, an ultraviolet radiant energy source disposed below said fluorescent screen for exciting the latter, an infrared radiation source supported above said selected record plane for directing infrared radiation energy to said fluorescent screen through said transparency record to be modulated by density variations in the transparency image and differentially quench luminescence of the fluorescent screen in relation to density radiations in the transparency image, supporting means for said stage plate including a pair of eccentric rotatable members upon which the stage plate rests adjacent a pair of opposite edges of the stage plate, means for rotating said eccentric members about their axes for moving the stage plate vertically and thereby adjusting the spacing between the transparency supported on the stage plate and the fluorescent screen to produce blurring of the infrared image transmitted through said transparency to said fluorescent screen at the zones of density change of the image in relation to the spacing and cause the fluorescent screen to exhibit an unsharp reversed image of the transparency image, and image magnifying means above said pressure plate for producing a magnified image of said transparency and unsharp reversed images on a viewing screen wherein the zones of change in density of the transparency image are enhanced.

7. Apparatus for enhancing imagery of photographic transparency records containing an image comprising a transparent stage plate for supporting an image containing transparency in a selected record plane, a transparent pressure plate superposed over said stage plate and biased toward the latter for maintaining the transparency in flat condition on the stage plate, a substantially planar fluorescent screen having an area substantially coextensive with the area of the image in the transparency supported at a fixed station in spaced parallel relation below said stage plate, said fluorescent screen forming a back lighting light source for illuminating the transparency on said stage plate and having a coating of a material excitable by ultraviolet radiant energy to produce a light of visible frequency and being responsive to infrared radiation to quench the luminescence of the same in accordance with the quanta of infrared radiation received thereby, an ultraviolet radiant energy source disposed below said fluorescent screen for exciting the latter, an infrared radiation source supported above said selected record plane for directing infrared radiation energy to said fluorescent screen through said transparency record to be modulated by density variations in the transparency image and differentially quench luminescence of the fluorescent screen in relation to density radiations in the transparency image, supporting means for said stage plate including a pair of cylindrical rods on which the stage plate rests adjacent two of its edges supported for rotation about axes located eccentrically of the centers of the rods and disposed parallel to the plane of the stage plate, means for rotating said rods about their axes for moving the stage plate vertically and thereby adjusting the spacing between the transparency supported on the stage plate and the fluorescent screen to produce blurring of the infrared image transmitted through said transparency to said fluorescent screen at the zones of density change of the image in relation to the spacing and cause the fluorescent screen to exhibit an unsharp reversed image of the transparency image, and a Schmidt camera system disposed above said pressure plate for producing a magnified composite image of said transparency and unsharp reversed image in substantial registry on a viewing screen including a spherical reflecting mirror having a central aperture therein above said transparency image, a collecting mirror for reflecting light passing through said aperture from said transparency and unsharp reversed images onto said spherical reflecting mirror, and a correction plate for correcting distortions of image-forming rays reflected by said spherical reflecting mirror toward the viewing screen.

References Cited in the file of this patent

UNITED STATES PATENTS

| | | |
|---|---|---|
| 2,521,953 | Tuttle | Sept. 12, 1950 |
| 2,996,617 | Heckscher | Aug. 15, 1961 |

FOREIGN PATENTS

| | | |
|---|---|---|
| 1,002,056 | France | Mar. 3, 1952 |
| 879,325 | Germany | June 11, 1953 |
| 461,938 | Italy | Feb. 20, 1951 |